2,749,227

METHOD OF DEFOLIATING WITH SODIUM CHLORATE AND SODIUM METABORATE

Irvin W. Bales, Westfield, N. J., assignor to Chipman Chemical Company, Inc., Bound Brook, N. J., a corporation of New York No Drawing. Application July 28, 1953,
Serial No. 370,895

6 Claims. (Cl. 71—2.2)

This invention relates to a method of defoliating plants, especially cotton with a chlorate base defoliant. The method of the invention gives excellent results in defoliating efficiency, ease of formulation and application, and optimum non-flammability.

Sodium and analogous chlorates have been proposed heretofore as defoliants. In U. S. Patent No. 2,368,275, for instance, a method is described of defoliating cotton by the application of 10 to 150 pounds per acre of the chlorate.

Sodium chlorate, however, greatly accelerates the burning of inflammable matter. For this reason, sodium chlorate alone is entirely impractical as a defoliant because the fire hazard is much too great to be tolerated.

With the present invention, cotton is defoliated by the application of 1½ to 8 pounds per acre of the chlorate, together with, on the average, about equal weight of sodium metaborate, $Na_2B_2O_4.8H_2O$ or from 1 to 24 pounds of $Na_2B_2O_4.8H_2O$ per acre, depending on the degree of fire protection desired.

It has long been known that ordinary borax ($Na_2B_4O_7.10H_2O$) imparts resistance to inflammability of materials treated with it. The addition of borax to sodium chlorate for the purpose of minimizing the fire hazard, while desirable in theory, is impractical because borax is not very soluble in water. For instance, when sodium chlorate is used in a concentration of 1 pound per gallon, as is common, it is possible to dissolve only about one-quarter pound of borax in the cold solution. This small amount does not have any substantial effect and certainly not a sufficient effect in reducing the fire hazards of the chlorate.

It has also been proposed to carry out defoliation with a mixture of sodium chlorate and sodium pentaborate. The sodium pentaborate ($Na_2B_{10}O_{16}$) is essentially a combination of six mols of boric acid and one mol of borax. (Thus, $6H_3BO_3+Na_2B_4O_7 \rightarrow Na_2B_{10}O_{16}+9H_2O$.) Such a composition, even when in admixture with the chlorate, is neutral or only slightly acid in the concentration in which it is applied.

It has been discovered in accordance with this invention that cotton and other plants may be defoliated with a mixture of sodium chlorate and sodium metaborate. The sodium metaborate is extremely soluble and may be included in adequate amounts with the sodium chlorates. A mixture of the two in any desired ratio can be placed in solution without any difficulty. This facilitates marketing the composition as a concentrated liquid. If it is marketed as a dry solid, the mixture readily dissolves even in cold water.

The sodium metaborate also imparts entirely satisfactory fire-resistant properties to the composition and to the plants sprayed with the chlorate containing the sodium metaborate.

It has also been discovered in accordance with the invention that the sodium metaborate enhances the defoliant action of the sodium chlorate. This may be attributed, at least in part, to the alkalinity of the sodium metaborate and of the mixture therewith of the chlorate.

Sodium metaborate, as this term is used in this application, has the formula: $Na_2B_2O_4.8H_2O$. It is readily available on the open market. A drier form, $$Na_2B_2O_4.4H_2O$$

and an anhydrous form, $Na_2B_2O_4$, are also known. When quantities or percentages are hereinafter specified, the $Na_2B_2O_4.8H_2O$ form is referred to.

Sodium metaborate is made by combining two mols of caustic soda with one mol of borax in accordance with the following equation (ignoring for simplicity any water of crystallization that combines upon crystallization):

$$2NaOH+Na_2B_4O_7 \rightarrow 2Na_2B_2O_4+H_2O$$

Thus it will be seen that the metaborate, which is made by combining ordinary borax (a material that is alkaline in itself) with two mols of caustic soda, is a borate which is pronouncedly alkaline. When this is combined with the sodium chlorate, the mixture of course will be highly alkaline.

The proportions of the chlorate and the metaborate to be applied in the defoliating process may be varied depending largely on the amount of fire protection deemed desirable, generally the mixture will contain 25 to 60% of the chlorate and 75 to 40% of the metaborate, preferably about 35 to 45% sodium chlorate.

The composition can be made up in various ways. Assuming the dry composition is to contain 45% sodium chlorate and 55% sodium metaborate and is to be marketed in a concentrated liquid form, it may be made by mixing in solution 200 pounds of sodium chlorate with 118 pounds of octahedrel (pentahydrate) borax and 40 pounds of caustic soda, with water to make 100 gallons. All the material readily goes into solution. When the material is utilized in defoliating it may be diluted to the required extent. If the solution obtained here is allowed to evaporate in the air and at room or ordinary temperatures, a uniform, dry crystalline composition is obtained which contains about 45% $NaClO_3$ and 55% $Na_2B_2O_4.8H_2O$. In another embodiment of the invention the chlorate and the metaborate may be combined in a dry form. The sodium chlorate and the sodium metaborate may be physically mixed and the ingredients sold in such a physical mixture. Alternately, the sodium chlorate and the sodium metaborate may be co-crystallized from a common menstruum so that at least a part of each crystal or granule contains some chlorate and some metaborate. This prevents stratification of the ingredients during shipping. In another embodiment of making the composition such as described in the copending application Serial No. 371,710 filed July 31, 1953, ordinary borax may be combined with caustic soda in proportions to give the metaborate, and in the presence of water to provide the equivalent of 4 to 8 molecules of water of crystallization and the sodium chlorate may be added near the end of this reaction to give a mixture co-crystallized by means of the water of crystallization which is absorbed in the final product.

In all of the above discussions it is assumed that the metaborate is substantially the pure compound. However, for most practical purposes it will be made by combining ordinary borax with the caustic soda and the relative proportions need not be exact. Thus, if slightly less than the theoretical amount of caustic is used, the product will be one primarily of the metaborate with a slight amount of unconverted borax. If, on the other hand, the amount of caustic is slightly in excess of theoretical requirements, the final product will be a mixture of the metaborate with an excess of caustic. In all cases the essential and major ingredient will be the metaborate. In many instances it is desirable to include a slight excess of caustic in order that the mixture will be assured of the optimum alkalinity. Reference hereinafter to the sodium metaborate is intended to include it together with minor amounts of excess borax or caustic as may result from formation of the metaborate from inexact proportions of the borax and caustic soda.

The defoliating method utilizes a relatively small amount of the composition, and since the chlorate is the primary defoliant ingredient, the rate of application is expressed in terms of the amount of chlorate applied per acre, the composition is applied at the rate of 1½ to 8 pounds of chlorate per acre, as distinguished from the 10 to 150 pounds per acre recommended in U. S. Patent No. 2,368,275. The effectiveness of this small amount may be attributed at least in part to the coaction of the two ingredients, and in this respect, the sodium metaborate is definitely an active ingredient of the composition.

When the mixture is to be applied to the plants as an aqueous solution, the concentration of the mixture of the sodium chlorate and the sodium metaborate in the solution is not too critical as long as the ingredients are in solution and the solution is uniformly applied such as by spraying. Generally, the composition will be placed in solution in an amount of 1 to 2 pounds per gallon for airplane spraying, and ½ to 1 pound per gallon for ground spraying.

The mixture can also be applied as a dust. In this form, however, the mixture is applied at the rate of up to 12 to 15 pounds of chlorate per acre, due to the natural inefficiency of a dust as compared with a liquid. In the dust form the chlorate and metaborate are uniformly mixed with any of the powdered carriers conventionally used in formulating agricultural dusts, and the concentration of ingredients in the dust may vary, depending upon the rate of application of the total dust per acre to give a chlorate application within the range mentioned.

The defoliating method minimizes the fire hazard and permits the use of sodium chlorate as an active ingredient of the defoliant in a uniformly effective and safe way and at a reasonable cost. Sodium metaborate is cheaper than the pentaborate, and much more soluble than either the pentaborate or ordinary borax.

The fire resistance of the composition may readily be determined by mixing a quantity of the dry material with an equal weight of fine sawdust, and applying indirect heat or direct flame. The mixture is difficult to ignite, and, if the heat or flame is removed, burning will slow down or stop. When sodium chlorate alone is similarly mixed with sawdust and heated, ignition is instantaneous, explosive and complete. Altho anhydrous sodium metaborate has fire-retarding properties of its own, it is inferior in this respect to the intermediate crystallized compound, $Na_2B_2O_4.4H_2O$, and very much inferior to the compound with which we are dealing, $Na_2B_2O_4.8H_2O$. Since sodium metaborate readily crystallizes cold with 8 molecules of water of crystallization ($Na_2B_2O_4.8H_2O$), the presence of this relatively large amount of water of crystallization in the dried material after application assists in overcoming the fire hazards of the composition.

In addition, the sodium metaborate enhances the defoliating action of the chlorate probably due to the alkalinity. The exact reason for this is not known. It may cause a more penetrating action on the part of the chlorate or it may neutralize acids liberated by the plant material and which would interfere with the action of the sodium chlorate. It may shift the equilibrium so that the $ClO_3$ ion is more effective.

As illustrative of one of the best modes of carrying out the invention, a composition was prepared containing 2 pounds of sodium chlorate and 2½ pounds of sodium metaborate per gallon of solution. The ingredients went into solution readily in cold water with a minimum of agitation. The solution was diluted with an equal volume of water and was sprayed from an airplane on cotton which was sufficiently matured to be in condition for defoliation. The diluted solution was sprayed at the rate of 2 to 8 gallons per acre, which is equivalent to 2 to 8 pounds of chlorate per acre, depending on the type of cotton, maturity of the crop, season, weather and other field conditions as will be recognized by one skilled in the art. It was found that the leaves fell off the cotton in a uniform defoliating action within 5 to 15 days and the cotton could be mechanically harvested in the usual manner.

The expression "consisting essentially of" is used in this application to indicate that the sodium chlorate and sodium metaborate are the components essential for obtaining the advantages of the invention. This is meant to exclude from the composition only those ingredients in such amounts as would nullify the advantageous properties of the composition and not to exclude the inert materials or other ingredients which have no effect or which have some other beneficial effect, such as hydroscopic agents, wetting agents, etc. without detracting from the advantages described herein, as is the recognized meaning of the quoted expression.

While I have described the invention utilizing sodium chlorate and sodium metaborate, it will be obvious to one skilled in the art that potassium chlorate and potassium metaborate and other alkali metal salts of either may be used and are the equivalents of the sodium salts. However, since economics dictate the use of sodium salts in view of their suitability for the purpose, they have been described as the best mode of practicing the process.

I claim:

1. The method of defoliating cotton and other plants which comprises applying thereto in an amount to effect defoliation a mixture of sodium chlorate and sodium metaborate in the proportions of 25 to 60% of the chlorate and 75 to 40% the metaborate.

2. The method of claim 1 in which the proportions are about 35 to 45% the chlorate and about 65 to 55% the metaborate.

3. The method of claim 1 in which the chlorate and metaborate are applied in the form of an aqueous solution.

4. The method of claim 2 in which the chlorate and metaborate are in the form of an aqueous solution and are applied by spraying at a rate of 1½ to 8 pounds of the chlorate per acre.

5. The method of claim 1 in which the chlorate and the metaborate are applied in the form of a dust.

6. The method of claim 2 in which the chlorate and metaborate are applied in the form of a dust at a rate of not in excess of about 12 to 15 pounds of the chlorate per acre.

References Cited in the file of this patent

UNITED STATES PATENTS 2,368,275     Torley  ---------------- Jan. 30, 1945